United States Patent [19]
Han

[11] Patent Number: 5,398,230
[45] Date of Patent: Mar. 14, 1995

[54] APPARATUS FOR SIMULTANEOUSLY MOVING THE PICKUP AND TURNTABLE OF A DISK PLAYER

[75] Inventor: Yeon T. Han, Suweon, Rep. of Korea

[73] Assignee: SamSung Electronics, Ltd., Suwon, Rep. of Korea

[21] Appl. No.: 876,413

[22] Filed: Apr. 30, 1992

[30] Foreign Application Priority Data

May 3, 1991 [KR] Rep. of Korea .............. 91-7164

[51] Int. Cl.$^6$ .................. G11B 21/02; G11B 25/04
[52] U.S. Cl. ................................ 369/219; 360/109
[58] Field of Search .......... 369/215, 219, 220, 221, 369/214, 264, 266, 213; 360/109

[56] References Cited

U.S. PATENT DOCUMENTS

| | | | |
|---|---|---|---|
| 3,272,513 | 9/1966 | Jeles | 369/213 |
| 4,123,780 | 10/1978 | Honjo | 369/213 |
| 4,807,219 | 2/1989 | Kyohya | 369/220 |
| 5,025,371 | 6/1991 | Heinrich | 369/219 |

FOREIGN PATENT DOCUMENTS

| | | | |
|---|---|---|---|
| 59-116964 | 7/1984 | Japan | 369/215 |
| 61-151889 | 7/1986 | Japan | 360/99.08 |
| 62-248175 | 10/1987 | Japan | 369/215 |
| 2-73532 | 3/1990 | Japan | 369/215 |
| 198685 | 1/1924 | United Kingdom | 369/213 |

Primary Examiner—Stuart S. Levy
Assistant Examiner—Kevin M. Watkins
Attorney, Agent, or Firm—Robert E. Bushnell

[57] ABSTRACT

A pickup moving apparatus for a disk player wherein a spindle motor unit for seating a disk and a pickup unit having a pickup can approach or separate from each other more rapidly via a moving part comprising a pinion gear driven by a motor, and rack gears respectively installed at a lower part of the spindle motor unit and a lower part of the pickup unit.

17 Claims, 3 Drawing Sheets

APPARATUS FOR SIMULTANEOUSLY MOVING THE PICKUP AND TURNTABLE OF A DISK PLAYER

FIELD OF THE INVENTION

The present invention relates to an apparatus for moving a pickup of a disk player and, more particularly, to an apparatus for moving a pickup wherein a spindle motor unit is provided with a turn table for seating a disk and a pickup unit is provided with the pickup which regenerates signals of a disk, so that the spindle motion unit and the pickup unit approach each other more rapidly.

BACKGROUND OF THE INVENTION

As shown in FIG. 1, in a conventional apparatus for moving a pickup of a disk player, one pair of guide bars 4 is installed in front of both sides of a spindle motor unit 3 which is provided with a turn table 2 for seating a disk 1. Further, a pickup 5 for regenerating signals of a disk 1 is installed on an upper part of the guide bars 4 and a pickup unit 6, holding the pickup 5 and having a rack gear 6a on a lateral side of the guide bars 4, is installed to undergo linear movement. Also, a pinion gear 7 is driven by a motor (not shown) and operated in mesh with the rack gear 6a on one side of the pickup unit 6.

In the above described conventional disk player, in order to regenerate signals recorded on the disk 1, the disk 1 is placed on the turn table 2 on top of the spindle motor unit 3 and then the motor drives the pinion gear 7.

As the pinion gear 7 is revolved by the motor, the pinion gear 7 meshes with the rack gear 6a, thereby linearly moving the pickup unit 6, which is guided by the guide bars 4, toward the spindle motor unit 3, so that the signals of the disk 1 are regenerated in response to the actuation of the turn table 2 and the pickup 5.

However, when the pickup unit 6 moves toward the spindle motor unit 3, it takes too much time to prepare the regeneration of the signals because only the pickup unit 6 can move unilaterally to the fixed spindle motor unit while the spindle motor unit cannot move at all.

SUMMARY OF THE INVENTION

The present invention overcomes the above described problems of the conventional technique and provides an apparatus for moving a pickup of a disk player in which a spindle motor unit and a pickup unit can move at the same time so that a pickup can more rapidly approach a disk and a preliminary time for regenerating signals recorded on a disk can be shortened.

The present invention is characterized in that the spindle motor unit and the pickup unit can move simultaneously to or from each other along guide bars by means of moving means in a pickup moving apparatus, in which the pickup unit is provided with a pickup for regenerating signals of a disk placed on a turn table on top of the spindle motor unit and moves along the guide bars.

BRIEF DESCRIPTION OF THE DRAWINGS

The above objects and other advantages of the present invention will become more apparent by describing in detail the embodiment of the present invention with reference to the attached drawings, in which.

DETAILED DESCRIPTION OF THE PREFERRED EMBODIMENT

Figure 1:
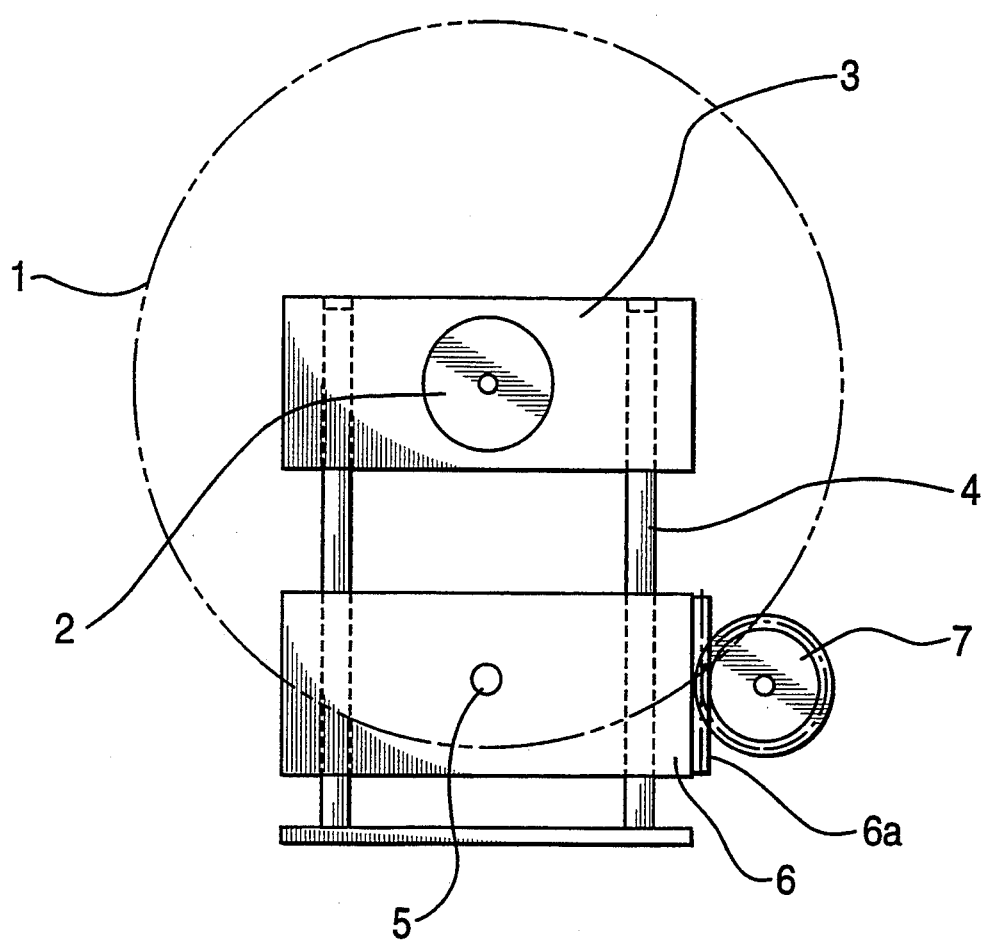
FIG. 1 is a plane vies of a conventional pickup moving apparatus.
Figure 3:
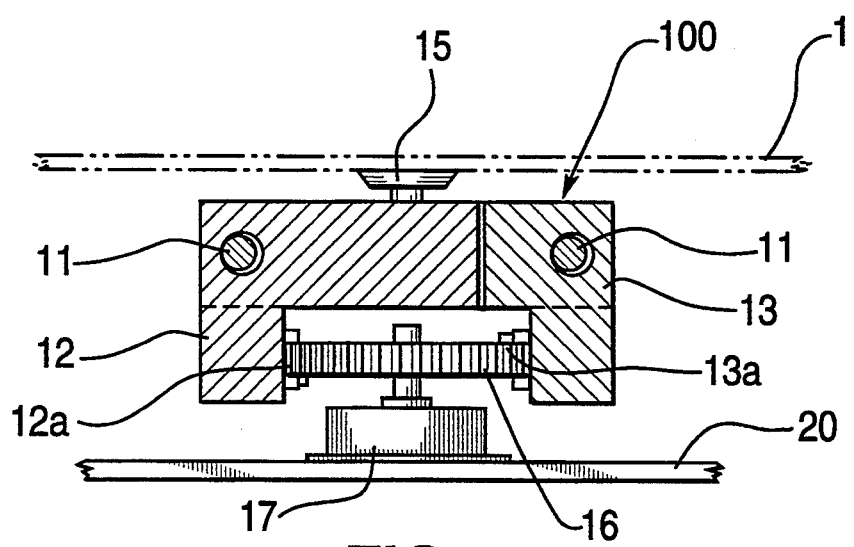
FIG. 3 is a cross-sectional view along a line III–III' on FIG. 2B.
Figure 2A:
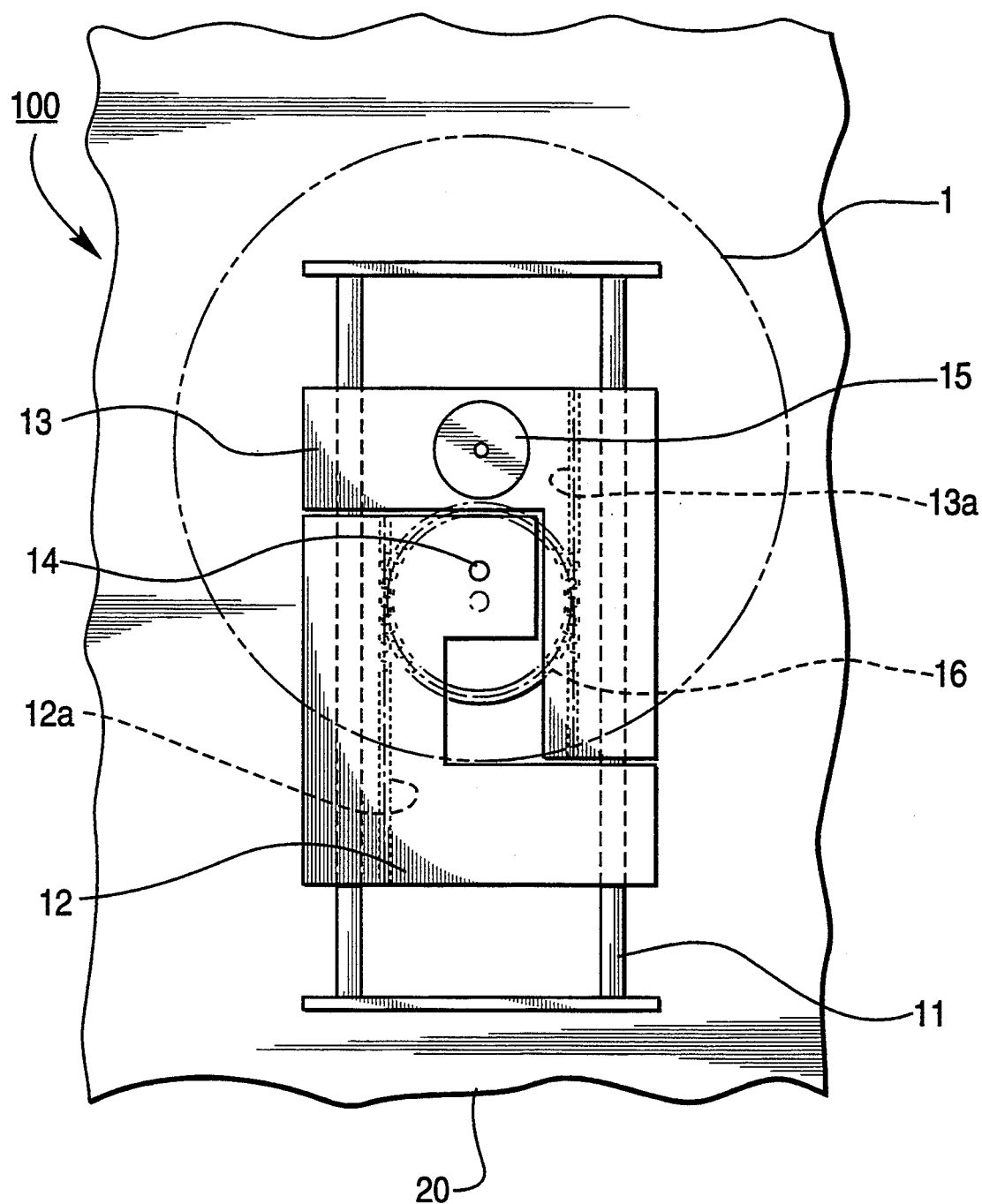
FIGS. 2A and 2B are plane views respectively, showing structure and operation of an apparatus for moving a pickup of a disk player according to the present invention.
Figure 2B:
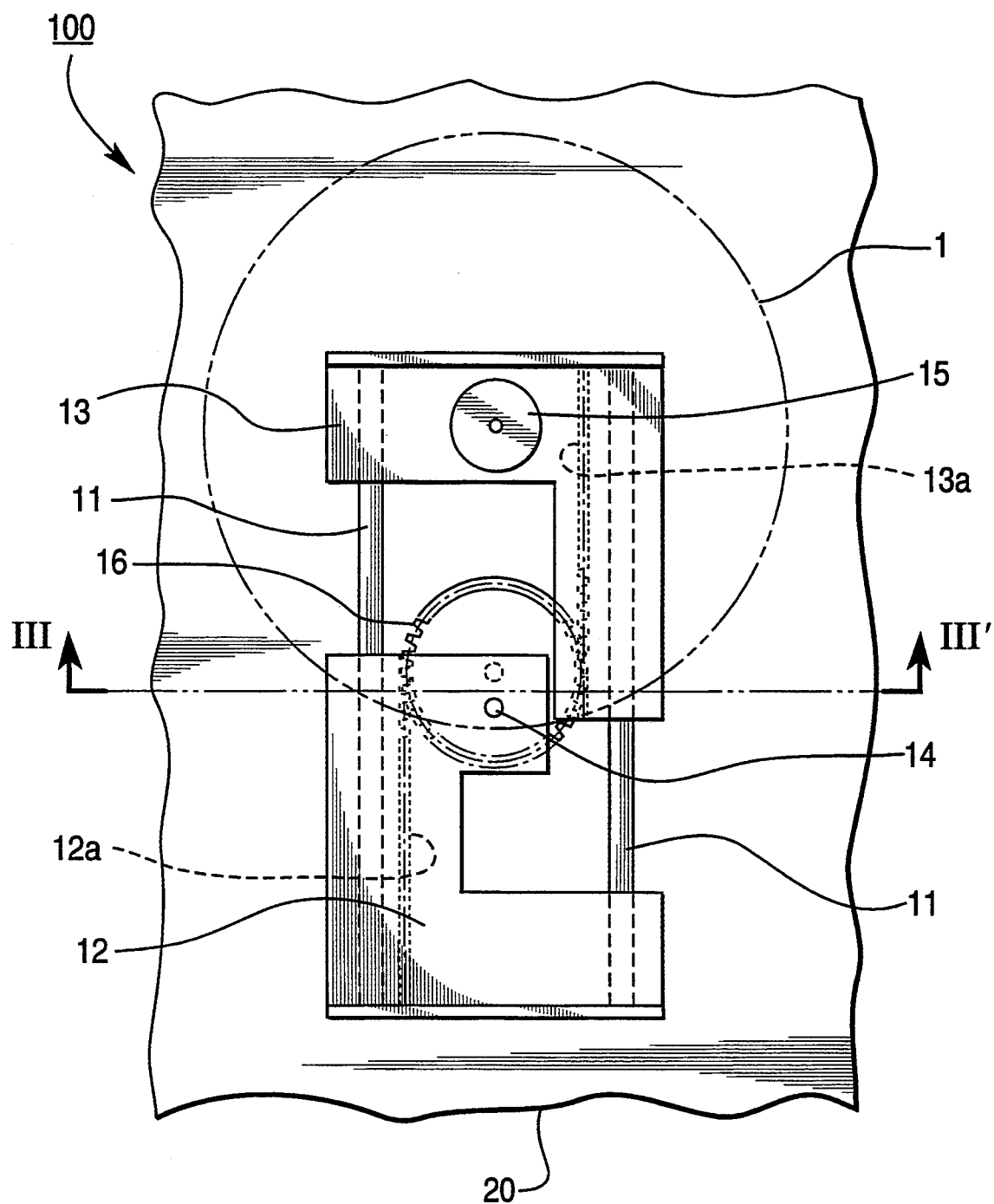

FIGS. 2A and 2B are plane views respectively, showing structure and operation of an apparatus for moving a pickup of a disk player according to the present invention and FIG. 3 is a cross-sectional view along a line III–III' of FIG. 2B.

The pickup moving apparatus 100 of the present invention is so constructed that a " "-shaped spindle motor unit 13, in which a turn table 15 for chucking a disk is mounted thereon, and a " "-shaped pickup unit 12, in which a pickup 14 for reading signals is installed thereon, can move to or from each other at the same time along guide bars 11 installed at a predetermined position of a main body 20, by means of a moving means.

The moving means is driven by a motor 17 and consists of a pinion gear 16 which is installed at the lower central part of the pickup moving apparatus and rack gears 12a and 13a commonly in mesh with the pinion gear 16 at opposite sides of the pinion gear 16. These rack gears 12a and 13a face each other at the lower inside of the pickup unit 12 and the lower inside of the spindle motor unit 13, respectively.

Accordingly, the spindle motor unit 13 and the pickup unit 12 can move to or from each other at the same time in response to the revolution of the pinion gear 16.

The operation of the pickup moving apparatus according to the present invention is briefly described below.

The disk 1 is chucked on the turn table 15 which is installed on the upper plane of the spindle motor unit 13, and the motor 17 is driven to revolve the pinion gear 16.

According to the revolution of the pinion gear 16, the spindle motor unit 13 and the pickup unit 12 move to or from each other by the motion of the rack gear 13a of the spindle motor unit 13 and the rack gear 12a of the pickup unit 12.

Consequently, the spindle motor unit 13 and the pickup unit 12 move to or from each other more rapidly, corresponding to the revolving direction of the pinion gear 16.

As described above, the apparatus for moving a pickup of a disk player according to the present invention is so designed that a spindle motor unit having a turn table for seating a disk and a pickup unit having a pickup for reading signals of a disk can approach or separate more rapidly to or from each other, thereby reducing a preliminary time for regenerating the signals recorded on the disk.

What is claimed is:

1. An apparatus for moving a pickup of a disk player, said pickup being positionable to reproduce signals stored on a disk disposed on a turntable, said apparatus comprising:

a pickup unit having a supporting surface and a first member defining a first inner surface extending transversely from said supporting surface, said pickup unit for holding the pickup on said supporting surface;

a spindle motor unit having an upper plane and a second member defining a second inner surface extending transversely from said upper plane, said upper plane being disposed beneath and supporting the turntable;

a plurality of guide bars engaged by said pickup unit and said spindle motor unit while said pickup unit and said spindle motor unit are oriented with said first inner surface facing and spaced apart from said second inner surface to form a gap between said first member and said second member, said guide bars guiding said pickup unit as said pickup unit transports the pickup in a first direction toward or away from a center of the turntable and guiding said spindle motor unit as said spindle motor unit transports said turntable in a second direction opposite to said first direction;

moving means having a single motor driving a single engaging surface disposed within said gap, for simultaneously engaging said second inner surface of said spindle motor unit and said first inner surface of said pickup unit, for simultaneously moving said spindle motor unit and said pickup unit to approach each other along said guide bars, and for simultaneously moving said spindle motor unit and said pickup unit from each other, in dependence upon rotation of said motor.

2. The apparatus according to claim 1, wherein said moving means comprises:

a pinion gear driven by said motor; and a pair of rack gears, said rack gears facing each other and respectively located on said inner side of said second member of said spindle motor unit and on said inner side of said first member of said pickup unit;

said single engaging surface comprising a circumferential sector of said pinion gear simultaneously engaging and moving both of said rack gears during said rotation.

3. An apparatus for moving a pickup of a disc player, said pickup positionable to reproduce signals stored on a disk seated on a turntable of a disk player, comprising:

a plurality of guide bars;

a pickup unit having a supporting surface and a first member defining a first inner surface extending from said supporting surface, for supporting the pickup on said supporting surface, said pickup unit disposed to move linearly along said guide bars toward or away from a center of the turntable;

a spindle motor unit having an upper plane and a second member defining a second inner surface extending from said upper plane, said upper plane being disposed beneath the turntable, said spindle motor unit disposed to move linearly along said guide bars with said first inner surface facing and being spaced apart from said second inner surface to form a gap between said first member and said second member; and moving means providing a single engaging surface disposed within said gap, for simultaneously engaging said second inner surface of said spindle motor unit and said first inner surface of said pickup unit, and for simultaneously driving both said spindle motor unit and said pickup unit to selectively move toward each other and away from each other in dependence upon modes of operation of the disk player.

4. The apparatus according to claim 3, wherein said moving means comprises:

a motor;

a pinion gear rotated by said motor, said pinion gear having a circumferential sector providing said single engaging surface;

a first rack gear and a second rack gear respectively located on said second inner surface and on said first inner surface of said first member, said first rack gear and said second rack gear meshing with said pinion gear;

said first rack gear and said second rack gear respectively moving in a first linear direction and in a second linear direction opposite to said first linear direction when said pinion gear rotates in a first rotational direction, and said first rack gear and said second rack gear respectively moving in said second linear direction and in said first linear direction when said pinion gear rotates in a second an opposite rotational direction.

5. An apparatus for moving a pickup mounted on a pickup unit into position to reproduce signals stored on a disk seated on a turntable of a disk player, said apparatus comprising:

a spindle motor unit having an upper plane and a first member defining a first inner surface extending transversely from said upper plane, said upper plane being disposed beneath the turntable, said spindle motor unit disposed to move linearly for moving the turntable;

said pickup unit having a supporting surface and a second member defining a second inner surface extending transversely from said supporting surface, for holding the pickup on said supporting surface, said pickup unit disposed to move linearly along a radial direction toward or away from a center of the turntable;

guide means engaged by said pickup unit and said spindle motor unit while said pickup unit and said spindle motor unit are oriented with said second inner surface facing and spaced apart from said second inner surface to form a gap, between said first member and said second member, said guide means for supporting said spindle motor unit during said linear motion of said spindle motor unit, and for supporting said pickup unit during said linear motion of said pickup unit;

moving means comprising a single engaging surface disposed within said gap for simultaneously engaging said first inner surface of said first member of said spindle motor unit and said second inner surface of said second member of said pickup unit; and a single motor for moving said moving means;

said moving means moving said spindle motor unit towards said pickup unit during a first mode of operation of the disk player, and said moving means moving said spindle motor unit away from said pickup unit during a second mode of operation of the disk player.

6. The apparatus of claim 5, wherein said moving means comprises:

a gear having a circumferential sector providing said single engaging surface;

said motor for rotating said gear;

a first rack located on said second inner surface of said second member of said pickup unit, and engaging said circumferential surface of said gear on a first side of said gear;

a second rack located on said first inner surface of said first member of said spindle motor unit, and engaging said circumferential surface of said gear on a second side of said gear opposite from said first side of said gear;

said first rack and second rack moving respectively in a first linear direction and a second linear direction opposite said first linear direction by said gear rotating in a first rotational direction, and said first rack and said second rack moving respectively in said second linear direction and said first linear direction by said gear rotating in a second rotational direction opposite said first rotational direction.

7. The apparatus of claim 6, wherein said gear is located between said pickup unit and said spindle motor unit.

8. The apparatus of claim 6, wherein said guide means comprises:

a first guide rail passing through said pickup unit and said spindle motor unit; and a second guide rail parallel to said first guide rail, passing through said pickup unit and said spindle motor unit.

9. The apparatus of claim 8, wherein said gear is located between said pickup unit and said spindle motor unit, and between said first guide rail and said second guide rail.

10. A method of positioning a pickup mounted on a pickup unit to reproduce signals from a disk mounted on a turntable rotated by a spindle motor unit in a disk player, comprising:

rotating a pinion gear in a first rotational direction during a first mode of operation of the disk player;

sliding a first rack gear meshed with said pinion gear, in a first linear direction in response to said rotation of said pinion gear in said first rotational direction, said pickup unit having a supporting surface with said first rack gear extending transversely from said supporting surface; and sliding a second rack gear, attached to said spindle motor unit and meshed with said pinion gear, in a second linear direction opposite said first linear direction in response to said rotation of said pinion gear in said first rotational direction said spindle motor unit having an upper plane and said second rack gear extending transversely from said upper plane such that said second rack gear faces and is spaced apart from said first rack gear to form a gap in which said pinion gear is located between said second rack gear and said first rack gear;

said pickup unit and said spindle motor unit moving toward each other in response to said sliding of said first rack gear and said second rack gear in said first linear direction and second linear direction, respectively.

11. The method of claim 10, further comprising:

rotating a pinion gear in said first rotational direction during a second mode of operation of the disk player;

sliding said first rack gear in said second linear direction in response to said rotation of said pinion gear in a second rotational direction; and sliding said second rack in said first linear direction in response to said rotation of said pinion gear in said second rotational direction;

said pickup unit and said spindle motor unit moving away from each other in response to said sliding of said first rack gear and said second rack gear in said second linear direction and said first linear direction, respectively.

12. An apparatus for moving a pickup mounted on a pickup unit into position, said pickup for reproducing signals from a disk seated on a turntable of a disk player, comprising:

a spindle motor unit having an upper plane and a first member defining a first inner surface extending transversely from said upper plane, said upper plane disposed beneath the turntable and said spindle motor unit disposed to move linearly in a first direction, for moving the turntable;

said pickup unit having a supporting surface and a second member defining a second inner surface extending transversely from said supporting surface, for holding the pickup on said supporting surface, said pickup unit disposed to move linearly in a second direction opposite said first direction while said first inner surface of said first member faces and is spaced apart from said second inner surface of said second member to form a gap between said first member and said second member;

moving means always spaced apart from the pickup, comprising a single engaging surface disposed within said gap for simultaneously engaging said first inner surface of said first member of said spindle motor unit and said second inner surface of said second member of said pickup unit and moving said spindle motor unit and said pickup unit in said first direction and said second direction, respectively; and said moving means moving said spindle motor unit and said pickup unit away from each other during a mode of operation of the disk player.

13. The apparatus as claimed in claim 12, wherein said moving means comprises;

a single motor;

a pinion gear rotated by said single motor;

a first rack gear attached to said second inner surface of said second member of said pickup unit and engaging said pinion gear;

a second rack gear attached to said first inner surface of said first member of said spindle motor unit and engaging said pinion gear; and said first rack gear and said second rack gear moving said pickup unit and said spindle motor unit, respectively, towards each other, in dependence upon said rotation of said pinion gear by said single motor.

14. A disk player having a pickup for reading data stored on a disk and a turntable for rotating said disk, comprising:

a pickup unit having a first side and a second side opposite said first side, said pickup unit having said pickup disposed on said first side of said pickup unit;

a spindle motor unit having a first side and a second side opposite said first side, said spindle motor unit having said turntable disposed on said first side of said spindle motor unit;

guide means slidably attached to said pickup unit and slidably attached to said spindle motor unit such that said pickup unit can slide along said guide means in a first and second direction and said spindle motor unit can slide along said guide means in said first and said second direction;

a first meshing means mounted on said second side of said pickup unit, said first meshing means facing in a first meshing direction;

a second meshing means mounted on said second side of said spindle motor unit while said second meshing means is spaced apart from and faces said first meshing means to form a gap between said first meshing means and said second meshing, means;

a rotating member positioned between said first meshing means and said second meshing means and disposed within said gap such that said rotating member is simultaneously engaged with and meshes with said first meshing means and said second meshing means; and rotating means for rotating said rotating member, causing said pickup unit and said spindle motor unit to slide along said guide means in said first direction and said second direction.

15. A disk player having a pickup for reading data stored on a disk and a turntable for rotating said disk as claimed in claim 14, wherein said rotating member comprises a gear having an outer edge, said gear having a plurality of teeth disposed along said outer edge of said gear.

16. A disk player having a pickup for reading data stored on a disk and a turntable for rotating said disk as claimed in claim 15, wherein said first meshing means comprises a first rack gear having a plurality of teeth disposed on said first rack gear to mesh with said teeth disposed along said outer edge of said gear, and said first rack gear is mounted on said second side of said pickup unit to mesh with said gear such that said pickup unit slides along said guide means in said first direction and said second direction as said gear rotates.

17. A disk player having a pickup for reading data stored on a disk and a turntable for rotating said disk as claimed in claim 16, wherein said second meshing means comprises a second rack gear having a plurality of teeth disposed on said second rack gear to mesh with said teeth disposed along said outer edge of said gear, and said second rack gear is mounted on said second side of said spindle motor unit to mesh with said gear such that said spindle motor unit slides along said guide means in said first direction and said second direction as said gear rotates and said pickup unit slides along said guide means in said first direction and said second direction as said gear rotates.

* * * * *